United States Patent [19]

Aston et al.

[11] 4,323,535
[45] Apr. 6, 1982

[54] MANUFACTURE OF THERMOPLASTICS PIPE

[75] Inventors: William C. Aston, Halesowen; Derek Walker, East Ardsley, both of England

[73] Assignee: Imi Yorkshire Imperial Plastics Limited, Leeds, England

[21] Appl. No.: 185,924

[22] Filed: Sep. 10, 1980

[30] Foreign Application Priority Data

Sep. 15, 1979 [GB] United Kingdom ............... 32062/79

[51] Int. Cl.³ ............................................. B29C 17/07
[52] U.S. Cl. ................................... 264/528; 264/531; 264/535; 264/570; 264/573
[58] Field of Search ............... 264/506, 507, 535, 573, 264/269, 531, 533, 528, 570; 425/522, 526, 541, 387.1, 392

[56] References Cited

U.S. PATENT DOCUMENTS 2,983,961 5/1961 Titterton .............................. 264/506
4,049,762 9/1977 Martino ............................... 264/531

FOREIGN PATENT DOCUMENTS 42-16434 9/1967 Japan ................................... 264/531
1432539 4/1976 United Kingdom .

Primary Examiner—Jan H. Silbaugh
Attorney, Agent, or Firm—Cushman, Darby & Cushman

[57] ABSTRACT

A method of manufacturing thermoplastics pipe by the radial expansion of a pipe blank within a mould. The blank 28 is inserted horizontally into a raised central mould portion 12, with the ends of the blank 28 extending outwardly of the ends of the central mould portion 12. Portion 12 is then lowered to a first position where mandrels 19, 20 enter the blank 28 from each end, and then a second position where mould end caps 15, 17 are closed onto the central mould portion 12, and heating and expansion of the blank 28 is then effected.

10 Claims, 3 Drawing Figures

MANUFACTURE OF THERMOPLASTICS PIPE

BACKGROUND OF THE INVENTION

This invention relates to the manufacture of thermoplastics pipe. In particular, it is concerned with a method for making a length of thermoplastics pipe by the radial expansion of a pipe blank within a circular cross-section mould. The invention is especially suitable for use with PVC (polyvinyl chloride) plastics to make pipes for water-supply and distribution purposes.

It has previously been proposed to heat a pipe blank within a mould and expand the pipe radially by means of liquid under pressure, see eg British Patent 1432539. The expansion at the temperature specified in that specification causes orientation of the thermoplastics material, which gives an increased hoop strength in the finished product. In this manner, relatively high strength pipes can be formed using a minimum of thermoplastics, and the principle has been found particularly suitable for the manufacture of large diameter PVC pipes.

The finished pipe, which has a socket formed at one end, may be of the order of 10 meters long with a diameter of 450 mm. (The starting blank has of course a smaller diameter). Both the blank and the finished pipe need to be handled and located with accuracy if the desired quality of product is to be achieved.

SUMMARY OF THE INVENTION

According to one aspect of the present invention, a method of manufacturing a length of thermoplastics pipe of circular cross-section by the radial expansion of a thermoplastics tubular pipe blank within a circular cross-section mould includes, prior to expansion, the steps of;

(a) inserting the blank into a substantially horizontally-extending cylindrical central mould portion, said central mould portion being in a raised position relative to a mould end portion, such that the blank after insertion extends outwardly of the end of the central mould portion adjacent the mould end portion.

(b) lowering the central mould portion containing the blank to a first predetermined position adjacent to but not registering with the mould end portion, said mould end portion having a mandrel which in said first predetermined position is capable of entering an end of the blank, and advancing the mould end portion towards the central mould portion, the extent of said advance being predetermined such that the mandrel enters an open end of the blank, but the mould end portion is not closed to the central mould portion, (c) lowering the central mould portion containing the blank to a second predetermined position co-axial with the mould end portion, and (d) advancing the mould end portion towards the central mould portion to close the mould in preparation for the heating and expansion of the pipe blank.

There may be two mould end portions adapted to be advanceable towards one another to close both the ends of the central mould portion. Alternatively, one end of the central mould portion may remain closed in use, said mould end moving with the central mould portion. In the former case, the central mould portion is lowered to first and second predetermined positions relative to both mould end portions, which mould end portions have mandrels having a common axis. Both mould end portions are advanced in the manner described above.

The final closing of the mould end portions towards the central mould portion may assist in driving the ends of the blank further on to their supporting mandrels.

The blank may be positioned in the central mould portion with both of its ends extending outwardly of the central mould portion, one end extending further than the other.

One of the mould end portions preferably includes at least part of a socket-forming portion for the finished pipe, and the blank may be inserted in the central mould portion such that it extends outwardly further from the central mould portion adjacent the mould end portion which includes at least part of the socket-forming portion of the mould. This greater outward extension is arranged so as to provide blank material for the forming of the socket.

The two mould end portions may advance simultaneously towards the central mould portion during their first movement towards one another and during the closure of the central mould portion. When the mould has been fully closed, the ends of the blank may be clamped to the mandrels to prevent axial contraction of the blank upon its subsequent radial expansion.

After expansion and cooling of the formed pipe the two mould end portions may be withdrawn sequentially, the mould end portion having the socket-forming portion being withdrawn prior to the withdrawal of the other mould end portion. During the withdrawal of the socket-forming end portion, a part of the blank surrounding the mandrel of the other end portion is retained clamped to said mandrel.

After withdrawal of the mould end portions from the central mould portion, the central mould portion containing the formed pipe may be tilted towards one mould end portion, preferably towards the mould end portion distant from the socket formed on the pipe, in order to remove water which has been employed during cooling from the interior of the formed pipe. The formed pipe having a socket portion at one end may be removed from the mould before cutting off of unexpanded parts of the pipe blank which have been clamped to the mandrels within the mould end portions during expansion.

BRIEF DESCRIPTION OF THE DRAWINGS

An embodiment of the invention will now be described, by way of example only, with reference to the accompanying drawings, in which.

DESCRIPTION OF THE PREFERRED EMBODIMENTS

Figure 1:
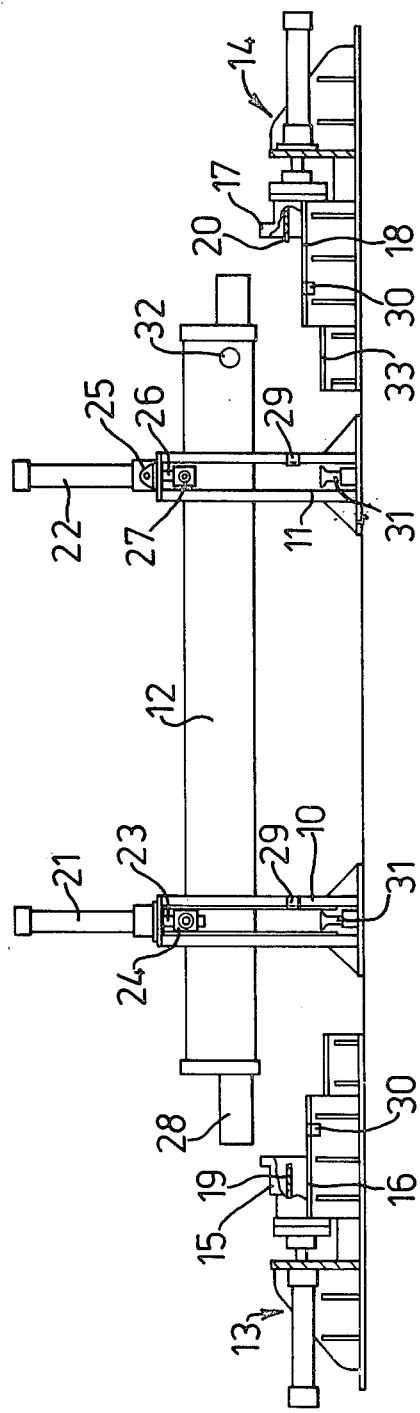
FIG. 1 is a side elevation of apparatus according to the invention shown in a first position.

A pair of vertical stanchions 10 and 11 are spaced along the line of the apparatus, and support a central mould portion 12. The central mould portion 12 is generally cylindrical in shape having a circular internal cross-section, and extends beyond the stanchions 10 and 11 at each end.

First and second hydraulically-operable ram assemblies 13 and 14 are located at positions spaced from the ends of the central mould portion 12, the rams being operable to move horizontally towards and away from the ends of the central mould portion 12. The first ram assembly 13 carries a first mould end portion 15 which is supported on a first guide track 16 extending towards the stanchions 10, 11. Similarly, the second ram assembly 14 carries a second mould end portion 17 which is supported on a second guide track 18 extending in an opposite direction towards stanchions 10, 11. The two ram assemblies 13, 14 are operable either simultaneously or separately.

The first mould end portion 15 is internally contoured to provide part of the socket-forming portion of the mould, the remainder of the socket-forming portion being located in the end of the central mould portion 12 closest to the first mould end portion 15. The diameter of the central mould portion is increased towards the end of the central mould portion adjacent the socket-forming mould end portion. A centrally-positioned hollow mandrel 19 extends within the first mould end portion 15, and has an external diameter slightly smaller than the internal diameter of the pipe blank to be inserted in the mould.

The second mould end portion 17 also has a centrally-positioned hollow mandrel 20 of the same diameter as that in the first mould end portion 15. The second mould end portion 17 tapers outwardly towards the open end facing the central mould portion 12. An annular space is provided around part of each mandrel 19, 20 such that the pipe blank when positioned in the mould ready for expansion extends into each annular space and is held by a seal which is capable of being pressurized to grip the ends of the pipe blank to prevent axial contraction of the pipe blank as it expands radially.

Each stanchion 10, 11 carries a hydraulically-operable piston and cylinder assembly, 21 and 22 respectively, mounted to the top of the stanchion. The piston and cylinder assembly 21 closest to the socket end of the mould is flange-mounted to stanchion 10 and the piston rod 23 extends downwardly to a yoke 24 attached to the upper side of the central mould portion 12. At its sideways extremities, yoke 24 is slidably moveable in a vertical direction between the uprights of stanchion 10, thereby ensuring that the central mould portion 12 is held longitudinally.

The piston and cylinder assembly 22 is trunnion-mounted at 25 to the top of stanchion 11, with the piston rod 26 attached to a yoke 27 mounted to the upper side of the central mould portion 12. This arrangement permits the piston and cylinder assembly 22 with its associated rod 26 to pivot relative to the top of stanchion 11, for reasons to be described later.

In use, a PVC pipe blank 28 is conveyed from a storage rack (not shown) in a direction parallel to its longitudinal axis, and enters the central mould portion in its first position as seen in FIG. 1. The blank 28 is longer than the central mould portion 12 and is positioned in the central mould portion 12 such that its ends extend out of either end of the central mould portion 12. The outward extension is arranged to be greater at the end of the central mould portion 12 adjacent the first or socket-forming mould end portion 15. The first and second mould end portions 15 and 17 are in their fully retracted positions as seen in FIG. 1.

Figure 2:
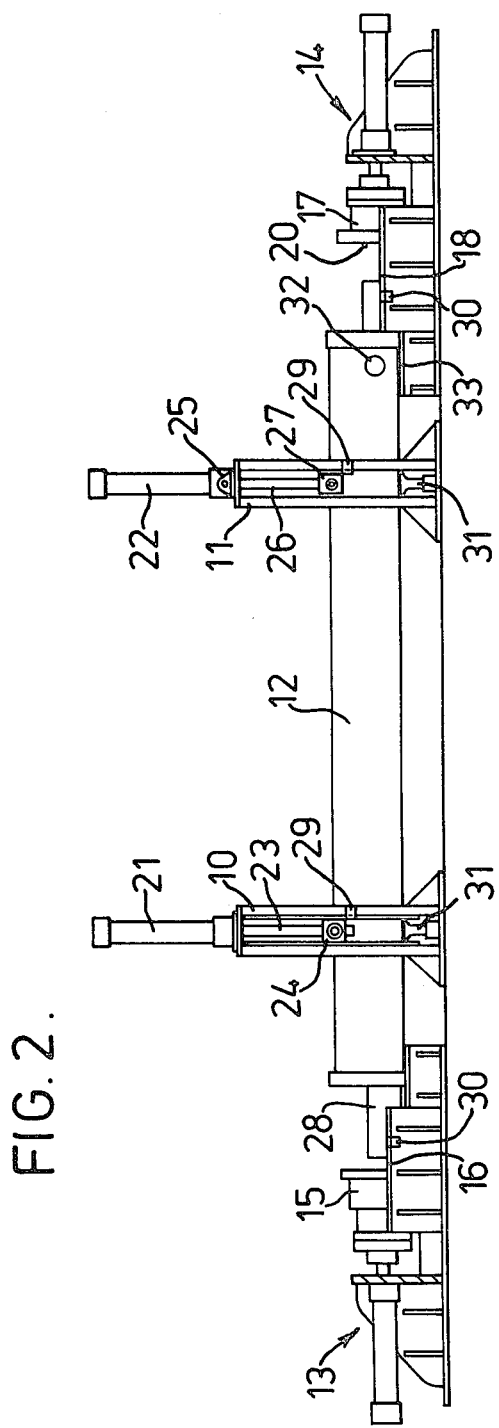
FIGS. 2 and 3 are similar elevations to FIG. 1 but with the apparatus illustrated in second and third positions respectively.

Piston and cylinder assemblies 21 and 22 are now actuated to lower the central mould portion 12 containing the blank 28 to a first predetermined position shown in FIG. 2. The central mould portion 12 is supported in this position by hydraulic jacks 31 positioned within stanchions 10 and 11 under the central mould portion 12, the jacks 31 being in a raised position. The blank 28 rests on the lower most internal surface of the central mould portion 12, and the predetermined position is such that the co-axial mandrels 19, 20 can engage the central mould portion 12, the jacks 31 being in a raised postion. The blank 28 rests on the lowermost internal surface of the central mould portion 12, and the predetermined position is such that the co-axial mandrels 19, 20 can engage the interior surface at the ends of blank 28. Each pair of mandrels is suitable for use with only one internal diameter size of pipe blank, and they will have chamferred ends to assist in their entry into the ends of the pipe blank 28. The first predetermined position is set by a pair of limit switches 29 on the stanchions 10 and 11 which are actuated by the respective yokes 24, 27 and which by means of suitable control circuits cause the respective piston and cylinder 21, 22 to come to rest.

Ram assemblies 13 and 14 are now actuated to simultaneously advance the mould end portions 15 and 17 towards the central mould portion 12. The spacing of the ends of blank 28 from the mandrels 19 and 20 prior to advancement is such that the chamferred ends of the mandrels engage the ends of the blank 28 at substantially the same time, and move inwardly within the ends of blank 28 until the ram assemblies 13, 14 are brought to rest with small gaps between the central mould portion 12 and the respective mould end portions 15 and 17. Limit switches 30 on guide track 16 are actuated by the advance of the mould endportions, and controls stop the movement of the two ram assemblies 13, 14 with the mould end portions 15, 17 at a predetermined position.

Figure 3:
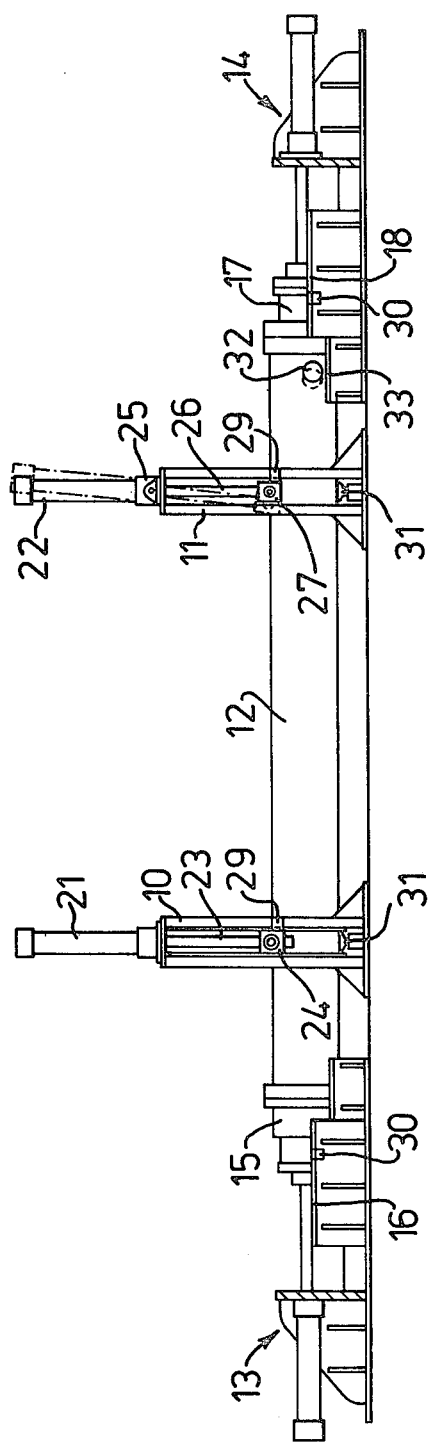

The piston and cylinder assemblies 21, 22 and the hydraulic jacks 31 are operated to lower the central mould portion 12 from its first predetermined position (see FIG. 2) to its second predetermined position (see FIG. 3) such that it is co-axial with the mould end portions 15, 17. The extent of the movement is determined by the lowered position of jacks 31 against which the central mould portion 12 comes to rest. When the central mould portion 12 is stationary in its second position, the ram assemblies 13, 14 are again actuated to close and locate the mould end portions 15, 17 in the central mould portion 12. In this position the blank 28 is supported at both its ends by the mould ends 15, 17. The end portions 15, 17 continue to be urged against the central mould portion to provide sealing of the mould during the subsequent operation. The ends of the blank 28 are held to the mandrel by gripping means.

Hot water is now pumped into the mould through passages (not shown) in the mould end portions, and the PVC pipe blank is allowed to heat up to the water temperature (around 90° C.). The blank 28 is then expanded radially by means of fluid pressure exerted from within the blank 28, thereby urging the blank 28 into engagement with the inner surfaces of both the central mould portion 12 and the mould end portions 15, 17. Following expansion, the pipe length is cooled by cold water passed through the pipe, and the expanded pipe with its socket portion is now ready for removal from the mould.

The mould end portions 15, 17 are withdrawn sequentially from the central mould portion 12 by the full retraction of the ram assemblies 13, 14, thereby pulling the mandrels 19, 20 out of the remaining portions of unexpanded blank 28 which were held by the gripping means. The first or socket-forming mould end portion 15 is withdrawn first after relaxing the grip on the end of the pipe held to mandrel 19, but with the other end of the pipe still held to mandrel 20. The second mould end portion 17 is then withdrawn, after relaxing the grip on the end of the pipe held to mandrel 20, the pipe being retained in the central mould portion 12 by virtue of its increasing diameter towards the end facing the first or socket-forming mould end portion 15.

The piston and cylinder assembly 21 mounted on stanchion 10 is now operated independently to lift socket-forming mould end portion 15, thereby tilting the central mould portion 12 towards the second mould end portion 17. The trunnion-mounting of the piston and cylinder assembly 22 on stanchion 11 permits the piston and cylinder assembly and its piston rod 26 to tilt as shown in dashed line in FIG. 3. A pivot pin 32, fixed adjacent the end of the central mould portion 12 distant from the socket-forming end portion 15, and moveable on a track 33, supports the lowermost end of the central mould portion 12 during the tilting operation. The yoke 27 has sufficient freedom of movement between the uprights of stanchion 11 to permit this tilting, and the operation enables water remaining in the formed pipe, particularly in the formed socket, to be poured out of the pipe into a suitable return conduit under the apparatus. It should be appreciated that at this stage there are small diameter portions at each end of the formed pipe, where the gripping mechanisms have held the pipe blank to the respective mandrels. These portions are cut off from the formed pipe after it has been removed from the mould.

We claim:

1. A method of manufacturing a length of thermoplastics pipe of circular cross-section by the radial expansion of a thermoplastics tubular pipe blank within a circular cross-section mould, said blank having an external diameter which is less than the interior diameter of the mould, said method including the steps of;
    (a) inserting the blank into a substantially horizontally-extending cylindrical central mould portion, said central mould portion being in a raised position relative to a mould end portion, such that the blank after insertion rests on the lowermost internal surface of the central mould portion and extends outwardly of the end of the central mould portion adjacent the mould end portion,
    (b) lowering the central mould portion containing the blank to a first predetermined position adjacent to but not registering with the mould end portion, said mould end portion having a mandrel which in said first predetermined position is capable of entering an end of the blank, and advancing the mould end portion towards the central mould portion, the extent of said advance being predetermined such that the mandrel enters an open end of the blank, but the mould end portion is not closed to the central mould portion,
    (c) lowering the central mould portion containing the blank to a second predetermined position co-axial with the mould end portion, and
    (d) advancing the mould end portion towards the central mould portion to close the mould in preparation for the heating and expansion of the pipe blank, and radially expanding the blank into contact with the internal surface of the mould.

2. A method according to claim 1 wherein the central mould portion is open at both ends, and there are two mould end portions which are advanced towards one another to close both the ends of the central mould portion.

3. A method according to claim 2 in which the central mould portion is lowered to first and second predetermined positions relative to both mould end portions, the mould end portions having respective mandrels having a common axis.

4. A method according to claim 2 in which the final closing of both mould end portions towards the central mould portion assists in driving the ends of the blank further on to their supporting mandrels.

5. A method according to claim 2 in which one of the mould end portions includes at least part of a socket-forming portion for the finished pipe, and the blank is inserted in the central mould portion such that it extends outwardly from both ends of said central portion but further from the end of the central mould portion adjacent the mould end portion which includes at least part of the socket-forming portion of the mould.

6. A method according to claim 5 in which the formed pipe having a socket portion at one end is removed from the mould prior to the cutting off of unexpanded parts of the pipe blank which have been held to the mandrels within the mould end portions during expansion.

7. A method according to claim 2 in which the two mould end portions are advanced simultaneously towards the central mould portion during their first movement towards one another and during the closure of the central mould portion.

8. A method according to claim 2 in which, after the mould has been fully closed, the ends of the blank are clamped to the mandrels to prevent axial contraction of the blank upon its subsequent radial expansion.

9. A method according to claim 2 in which, following expansion and cooling of the formed pipe, the two mould end portions are withdrawn sequentially, the mould end portion having the socket-forming portion being withdrawn prior to the withdrawal of the other mould end portion.

10. A method according to claim 9 in which, after withdrawal of the mould end portions from the central mould portion, the central mould portion containing the formed pipe is tilted towards one mould end portion in order to remove water which has been employed during cooling from the interior of the formed pipe.

* * * * *